(12) United States Patent
Barber (10) Patent No.: US 10,697,834 B2
(45) Date of Patent: Jun. 30, 2020

(54) CONTRAST PHANTOMS AND USES THEREOF FOR ACTIVE MILLIMETER WAVE IMAGING SYSTEMS

(71) Applicant: The Government of the United States of America, as represented by the Secretary of Homeland Security, Washington, DC (US)

(72) Inventor: Jeffrey Brian Barber, Vineland, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 16/279,380

(22) Filed: Feb. 19, 2019

(65) Prior Publication Data

US 2019/0178722 A1 Jun. 13, 2019

Related U.S. Application Data

(63) Continuation of application No. 16/058,053, filed on Aug. 8, 2018, now Pat. No. 10,254,170.

(60) Provisional application No. 62/542,596, filed on Aug. 8, 2017.

(51) Int. Cl.
| | |
|---|---|
| *G01J 5/32* | (2006.01) |
| *G01J 5/52* | (2006.01) |
| *G01J 5/04* | (2006.01) |
| *G01J 5/00* | (2006.01) |

(52) U.S. Cl.
CPC ............... *G01J 5/522* (2013.01); *G01J 5/046* (2013.01); *G01J 2005/0048* (2013.01); *G01J 2005/0077* (2013.01)

(58) Field of Classification Search
CPC .......................... G01J 5/522; G01J 2005/0077
USPC ....................................................... 250/252.1
See application file for complete search history.

(56) References Cited

U.S. PATENT DOCUMENTS

| | | | |
|---|---|---|---|
| 4,621,265 A * | 11/1986 | Buse | ....................... F41G 7/003 250/252.1 |
| 5,886,534 A | 3/1999 | Bakhtiari et al. | |
| 9,075,132 B2 | 7/2015 | Barber et al. | |

(Continued)

OTHER PUBLICATIONS

Barber, Jeffrey, et al., "Developing an ANSI standard for image quality tools for the testing of active millimeter wave imaging systems", Proceedings of SPIE vol. 10189, 1018905, May 11, 2017.

(Continued)

*Primary Examiner* — Taeho Jo
(74) *Attorney, Agent, or Firm* — Lavanya Ratnam; Kelly G. Hyndman (57) ABSTRACT

The present disclosure is directed to a contrast phantom having a first region with a first reflection coefficient, a second region with a second reflection coefficient, and a third region with a third reflection coefficient, wherein the first reflection coefficient, the second reflection coefficient and the third reflection coefficient are increasing or decreasing in value in discrete steps, and wherein at least one of the regions includes an electrically conductive material having a thickness of about 200 μm. Methods of testing the contrast resolution of an active millimeter wave imaging system using the contrast phantom are also described.

22 Claims, 5 Drawing Sheets

(56) References Cited

U.S. PATENT DOCUMENTS

| | | | |
|---|---|---|---|
| 2002/0173068 A1* | 11/2002 | Kido | C23C 14/352 |
| | | | 438/99 |
| 2007/0296624 A1* | 12/2007 | Katano | H01Q 17/00 |
| | | | 342/1 |
| 2012/0256777 A1 | 10/2012 | Smith et al. | |
| 2014/0014829 A1* | 1/2014 | Barber | G01S 7/40 |
| | | | 250/252.1 |
| 2015/0109655 A1* | 4/2015 | Vigneron | G02B 1/005 |
| | | | 359/290 |
| 2015/0275385 A1* | 10/2015 | Chandrasekhar | G02F 1/1506 |
| | | | 205/50 |
| 2016/0131756 A1 | 5/2016 | Einat et al. | |
| 2016/0245705 A1* | 8/2016 | Weatherall | G01J 5/522 |
| 2017/0184936 A1* | 6/2017 | Chandrasekhar | G02F 1/1506 |
| 2017/0356941 A1 | 12/2017 | Ahmed et al. | |

OTHER PUBLICATIONS

Smith, Peter R., et al., "Measurements of the dielectric properties of explosives and inert materials at millimeter wave frequenciess (V-band and above) using free space reflection methods", Proceedings of SPIE Vo. 10189, 1018908, May 11, 2017.

Pierre Désaulniers and Simon Thibault, Performance evaluation of panoramic electro-optic imagers using the TOD method, Proceedings of SPIE—The International Society for Optical Engineering, vol. 8014, 801409, May 2011.

Derraik, José G. B. et al., "Effects of Age, Gender, BMI, and Anatomical Site on Skin Thickness in Children and Adults with Diabetes", PLOS ONE, vol. 9, Issue 1, e86637, Jan. 21, 2014.

* cited by examiner

CONTRAST PHANTOMS AND USES THEREOF FOR ACTIVE MILLIMETER WAVE IMAGING SYSTEMS

CROSS REFERENCE TO RELATED APPLICATIONS

This application is a Continuation of U.S. patent application Ser. No. 16/058,053, filed 8 Aug. 2018, which claims the benefit of priority of U.S. Provisional Application No. 62/542,596, filed 8 Aug. 2017. The contents of these applications are herein incorporated by reference in their entirety.

BACKGROUND

The "background" description provided herein is for the purpose of generally presenting the context of the disclosure. Work of the presently named inventor, to the extent it is described in this background section, as well as aspects of the description, which may not otherwise qualify as prior art at the time of filing, are neither expressly nor impliedly admitted as prior art against the present disclosure.

Active millimeter wave imaging systems are being used at checkpoints for screening humans for security reasons. These systems illuminate a human target with millimeter wave radiation, generally in a range from 1-500 GHz, and collect signals reflected off a body. These signals are used to generate an image of a human target for the purposes of detecting threat objects, such as guns, knives, explosives, drugs, etc.

Generally millimeter wave images are contrast (grayscale) images. In order to ensure that an active millimeter wave imaging system is able to accurately detect a threat object, it is helpful to determine whether or not the imaging system can resolve differences in grayscale between objects of interest.

SUMMARY

The present inventor developed a convenient, inexpensive and robust contrast resolution target, referred to herein as a contrast phantom, which may be used to assess how well a given active millimeter wave imaging system can resolve differences in grayscale. The present contrast phantoms are made from electrically conductive materials, such as doped semiconductive oxides, which exhibit constant reflection coefficient values at millimeter wave frequencies.

In one aspect, the present disclosure is directed to a contrast phantom including: at least three regions including: a first region with a first reflection coefficient; a second region with a second reflection coefficient; and a third region with a third reflection coefficient, wherein at least one of the regions comprises an electrically conductive material selected from a semiconductive oxide deposited onto a substrate and/or an electrically conductive polymer, wherein the first reflection coefficient, the second reflection coefficient and the third reflection coefficient are increasing or decreasing in value in discrete steps, and wherein the electrically conductive material includes a thickness of about 200 μm or less.

The present disclosure is also directed to a contrast phantom comprising: a first region with a first reflection coefficient and a first conductivity; a second region with a second reflection coefficient and a second conductivity; a third region with a third reflection coefficient and a third conductivity; a fourth region with a fourth reflection coefficient and a fourth conductivity; and a fifth region with a fifth reflection coefficient and a fifth conductivity; wherein at least one of the regions comprises a semiconductive oxide deposited onto a substrate, wherein the semiconductive oxide deposited onto the substrate includes a thickness of about 200 μm or less, and wherein the reflection coefficients increase or decrease in value incrementally and linearly in discrete steps.

In another aspect, the present disclosure is directed to a method of testing a contrast resolution sufficiency of an active millimeter wave imaging system including: selecting at least a first, a second and a third material, wherein the first material includes a first reflection coefficient, the second material includes a second reflection coefficient, and the third material includes a third reflection coefficient, wherein at least one of the first material, the second material or the third material include(s) a semiconductive oxide deposited onto a substrate and/or an electrically conductive polymer; arranging the first, second and third materials into regions so that the first, second and third reflection coefficients increase or decrease in value; imaging the materials with the active millimeter wave imaging system; and determining the presence or absence of contrast resolution between the regions, thereby testing the contrast resolution sufficiency of the active millimeter wave imaging system.

BRIEF DESCRIPTION OF THE DRAWINGS

An appreciation of the disclosure and many of the attendant advantages thereof may be understood by reference to the accompanying drawings. Included in the drawings are the following figures.

DETAILED DESCRIPTION

Contrast Phantoms

The present disclosure is directed to a contrast phantom for an active millimeter wave imaging system. As used herein an "active millimeter wave imaging system" refers to an imaging device or system that directs electromagnetic energy at, for example, a subject, object or sample and then constructs an image based upon the energy reflected back from the subject, object or sample. Generally, the formed images are contrast (grayscale) images. The ability of an active millimeter wave imaging system to resolve differences in grayscale may be tested using a contrast phantom, such as the contrast phantom described herein.

As used herein, a "contrast phantom", a "contrast resolution target", and/or a "test object" are used interchangeably herein to refer to particularly designed objects that are imaged to evaluate, analyze, and/or tune the performance of an active millimeter wave imaging system.

In some embodiments, the present contrast phantom includes at least three regions, such as at least four regions, such as at least five regions, such as at least six regions, such as at least seven regions or such as at least eight regions. In some embodiments, at least one region of the present imaging phantom, such as at least two regions, such as at least three regions, such as at least four regions, such as at least five regions, such as at least six regions or such as at least seven regions include(s) a material having the following properties: an electrical conductivity and resistance, a discrete reflection coefficient, which is independent of frequency in the millimeter wave range, and a thickness much less than skin depth, i.e., the point at which current density reaches approximately 37% of its value at a surface of the material, for example $\lambda/10$ at an electromagnetic radiation frequency ranging from 1 to 500 GHz, such as 1 to 150 GHz, such as 70 GHz to 150 GHz, such as 18 GHz to 40 GHz.

The response of materials to electromagnetic radiation may be understood in reference to Jackson's "*Classical Electrodynamics*", which provides a detailed derivation of Maxwell's equations with respect to plane wave propagation in dielectric media. See Jackson, John D. *Classical Electrodynamics* p 341. John Wiley & Sons, Inc., 1999. Print., which is herein incorporated by reference in its entirety. Briefly, the propagation of electromagnetic radiation is a function of the complex dielectric constant for non-magnetic materials. Using Ohm's Law, the complex dielectric constant consists of a "normal" dielectric constant $\epsilon=n^2$ and a conductivity term $i\sigma/\omega$ where n is the index of refraction, $\sigma$ is the conductivity of the material and $\omega$ is the angular frequency of the radiation. Accordingly, by modulating the conductivity/resistance of a material, the reflection coefficient of a material can vary from near zero to unity. Consequently, a contrast phantom may be created with specific regions comprising materials of varying conductivity/resistance and, accordingly, varying reflection coefficients for the purposes of image grayscale calibration and testing of contrast resolution.

In some embodiments, the at least one region of the present imaging phantom includes an electrically conductive material having a reflection coefficient greater than 0 and less than 1, e.g., 0.2, 0.3, 0.4, 0.8, etc. Electrically conductive materials with reflection coefficients greater than 0 and less than 1 include without limitation ultrathin metals, electrically conductive polymers and/or semiconductive materials.

A suitable example of an ultrathin metal that may be used with the contrast phantom of the present disclosure includes an ultrathin silver metal. Suitable examples of electrically conductive polymers include polypyrrole, polyaniline, polyacetylene, polythiophene, polyphenylene vinylene, polyphenylene sulfide, poly p-phenylene, polyheterocycle vinylene, poly(3,4-ethylenedioxythiophene) and its derivatives.

In some embodiments, the electrically conductive polymers used in the contrast phantoms described herein are intrinsically electrically conductive, meaning that they are electrically conductive without the addition of electrically conductive materials such as carbon or a metal, although electrically conductive polymers usually require the addition of a dopant, e.g., electrically conductive carbon doped polycarbonate which is commercially available from e.g., Azo Materials, Inc. Manchester M1 4ET, UK.

In more typical embodiments, the electrically conductive materials having reflection coefficients greater than 0 and less than 1 that are suitable for use with the present contrast phantom includes semiconductor materials, such as semiconductive oxides, such as semiconductive metal oxides, such as tin-doped indium oxide (also known as indium tin oxide or ITO), aluminum-doped zinc oxide, indium-doped cadmium oxide, indium-doped zinc oxide, gallium-doped zinc oxide and antimony or fluorine-doped tin oxide. More typically, the semiconductive metal oxide is ITO.

Typically, the electrically conductive material of at least one region of the present contrast phantom is in the form of a coating or film. For example, ITO, which is typically a powdered mixture of indium(III) oxide ($In_2O_3$) and tin(IV) oxide ($SnO_2$), such as 90% $In_2O_3$, 10% $SnO_2$ by weight, may be deposited as a thin film or coating onto a substrate.

Any desired substrate may be used e.g., glass, semiconductors, plastics, etc. In some embodiments, the substrates are flexible films, such as polyethylene terephthalate (PET), polyethylene naphthalate (PEN), polyethersulfone (PES), polyetheretherketone (PEEK), polycarbonate (PC), polypropylene (PP), polyamide (PA), polyacryl (PAC), epoxy resins, phenolic resins, alicyclic polyolefins, or norbornene based thermoplastic transparent resins, or a laminate of two or more thereof.

The electrically conductive material, such as a semiconductive oxide, e.g., ITO, may be deposited onto a substrate in any desired manner such as by planar magnetron sputtering, closed field magnetron sputtering, ion beam sputtering, rotatable magnetron sputtering or reactive thermal and electron beam evaporation. Alternatively, electrically conductive materials with known sheet resistance values as described herein, such as semiconductive oxides, e.g., ITO, may be obtained commercially from, e.g., Sigma-Aldrich, Inc. (St. Louis, Mo.). For example, Sigma-Aldrich, Inc. ITO thin films having catalog numbers 749729, 749737, 749753, 749788 and 749818 are suitable for use with the present contrast phantom.

As noted above, the electrically conductive materials of the present contrast phantom with reflection coefficients greater than 0 and less than 1 typically may have a thickness of $\lambda/10$ at an electromagnetic radiation frequency ranging from e.g., 1 to 500 GHz. In some embodiments, the thickness of the electrically conductive material is one that allows the contrast phantom to be used with any active millimeter wave system implementing frequencies ranging from 1 to 500 GHz, such as from 1 GHz to 150 GHz, such as from 18 GHz to 40 GHz, such as from 70 GHz to 150 GHz. Accordingly, the thickness of the electrically conductive material, or the thickness of the electrically conductive material optionally deposited onto a substrate, having a reflection coefficient greater than 0 and less than 1 typically ranges from 200 micrometers (μm) ($\lambda/10$ at 150 GHz) or less, such as 150 nanometers (nm) or less, such as 100 nm or less, such as 10 nm or less, such as 50 ångströms or less. Typically, thicknesses of about 100 nm are used.

A reflection coefficient of the electrically conductive material of the present disclosure, which may be deposited as a thin film or a coating in the thicknesses described herein, may be determined from a sheet resistance $R_s$ of the material. As used herein "sheet resistance" refers to a measure of resistance of a thin film or coating, which is substantially uniform in thickness.

For example, the magnitude of the reflection coefficient of each region may be determined according to the following equation (1):

$$r = -1/1 + 2R_s/\eta_0 \quad (1)$$

wherein $R_s$ is the sheet resistance of the electrically conductive material in $\Omega$/square and $\eta_0$ is the impedance of free space, 377Ω. The negative sign in the above described equation indicates a 180° change in the phase of the reflected wave.

Further, without being limited by theory, it is believed that the type of electrically conductive material contained within one or more regions of the present contrast phantom is, generally, not necessary for reflection coefficient determination. Instead, it is contemplated that the reflection coefficient may be determined using only the sheet resistance of the electrically conductive material.

In some embodiments, at least one region of the present imaging phantom includes a "reference standard" material, e.g., a material having a known reflection coefficient of about 0, e.g. radar absorbing material, glass, plastic, rubber or having a known reflection coefficient of about 1, e.g. a metal, e.g., aluminum. Accordingly, in some embodiments, a contrast phantom of the present disclosure may include, for example, at least three regions, at least two of the regions comprising two different reference standard materials, such as a radar absorbing material and a metal sheet, and one electrically conductive material, such as ITO. Radar absorbing materials, such as electromagnetic wave absorbers using carbon ohmic resistivity with a formed polystyrol base material, are commercially available from e.g., TDK RF Solution, Inc. (Cedar Park, Tex.).

In some embodiments, the deposited electrically conductive materials and/or the reference standard materials of the regions of the present contrast phantom are supported by, for example, a rigid material, such as a radar absorbing material. The radar absorbing material may allow for a variety of contrast phantom forms as described herein and/or function to absorb energy passing from an active millimeter wave imaging system.

Figure 1:
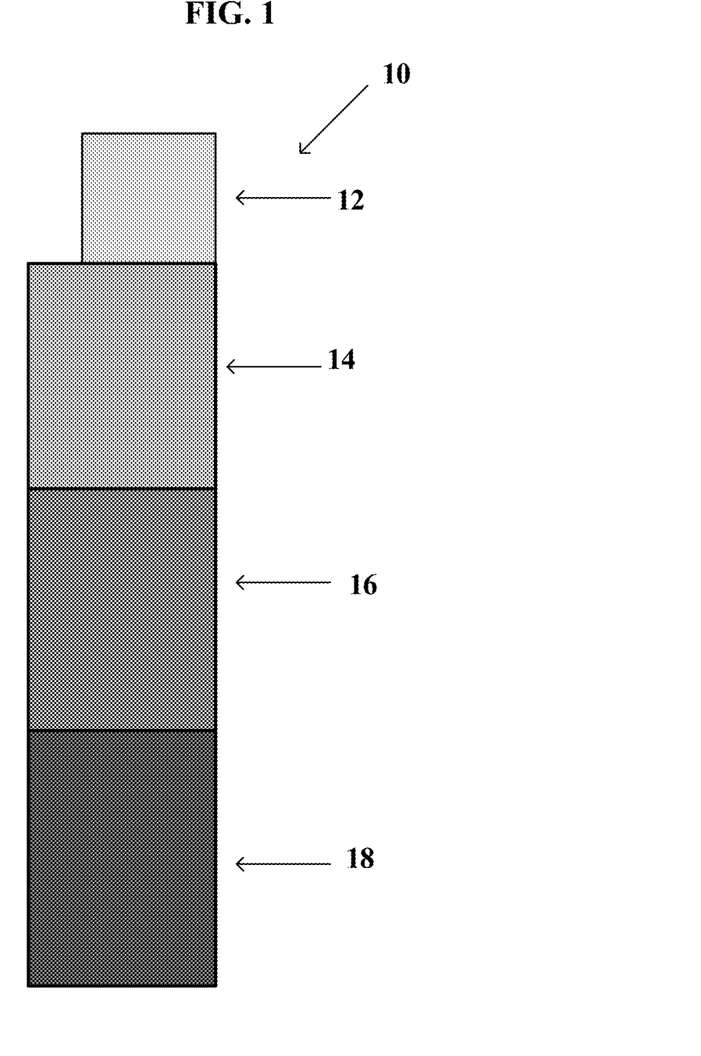
FIG. 1 depicts a planar implementation of a contrast phantom of the present disclosure as described in the detailed description.

FIG. 1 depicts an implementation of a contrast phantom 10 of the present disclosure. As depicted in FIG. 1, contrast phantom 10, includes at least three regions, such as at least four regions, e.g., region 12, region 14, region 16, and region 18. Each of these regions contains materials having a different reflection coefficient and sheet resistance, e.g., reflection coefficients ranging in value from 0 to 1. Region 12, for example, may include a reference standard material having a reflection coefficient of about 1 and a sheet resistance of about 0.03 Ω/square, such as, e.g., aluminum.

Regions 14, 16, and 18 may include an electrically conductive material having a reflection coefficient greater than 0 and less than 1, such as an ITO. One skilled in the art will appreciate that the electrical conductivity σ and sheet resistance $R_s$ of an electrically conductive material, such as a semiconductive oxide, e.g., ITO, is determined, at least in part, by the doping of the semiconductive oxide. Accordingly, in some embodiments, two or more regions of the present contrast phantom may contain an electrically conductive material comprising, for example, tin-doped indium oxide. Nevertheless, the conductivity σ and sheet resistance $R_s$ may vary between each region due to e.g., differences in the amount of tin doped into the indium oxide.

In other embodiments, at least two or more regions of the present contrast phantom may contain electrically conductive materials composed of different elements. For example, the at least two or more regions may include one region comprising a doped zinc oxide and another region comprising a doped indium oxide. In some embodiments, these different materials result in regions of the present contrast phantom having different electrical conductivity values σ, different sheet resistances $R_s$ and, accordingly, different reflection coefficients.

In some embodiments, the reflection coefficients of regions 14-16 may decrease in value in discrete steps. For example, regions 14-16 may each comprise an ITO of varying sheet resistances, e.g., 55 Ω/square to 300 Ω/square, and have reflection coefficients ranging from 0.9-0.1, such as 0.8 to 0.4. For example, region 14 may comprise an ITO having a reflection coefficient of about 0.8 and a sheet resistance of about 55 Ω/square, region 16 may comprise an ITO having a reflection coefficient of about 0.5 and a sheet resistance of about 200 Ω/square and region 18 may comprise an ITO having a reflection coefficient of about 0.4 and a sheet resistance of about 300 Ω/square.

In some embodiments, the regions of contrast phantom 10 comprise reference standard materials and/or electrically conductive materials with varying reflection coefficient values that vary in discrete steps in an increasing order. In some embodiments, the reflection coefficient values of the regions of the present contrast phantom may increase or decrease incrementally and linearly in discrete steps, e.g., the reflection coefficients may increase or decrease by 0.1, 0.2 or 0.3 increments in an increasing or a decreasing order. In other embodiments, the regions of the contrast phantom 10 have varying reflection coefficients that are in random order.

While it is noted that the regions of the contrast phantom of FIG. 1 are depicted as uniform sheets, the regions are not limited thereto. For example, in some embodiments, the regions of the present contrast phantom may be patterned to allow for more complex tests to be applied to millimeter wave imaging, such as triangle orientation discrimination as described, for example, in Desaulniers, et al., "Performance evaluation of panoramic electro-optic imagers using the TOD method," *Proc. SPIE*, 8014, 7 (2011), which is herein incorporated by reference in its entirety.

The contrast phantom of the present disclosure may be in any formation. Typically, however, current millimeter wave imaging systems are generally either planar or cylindrical. Accordingly, the present contrast phantoms may also be in a planar or cylindrical formation.

Contrast phantom 10 in FIG. 1, provides an implementation of a contrast phantom having a planar formation. In this formation, each of the regions 12-18 of contrast phantom 10 may be attached to a post, for example, such as a metal post, e.g., in a decreasing order of reflection coefficient values.

Figure 2:
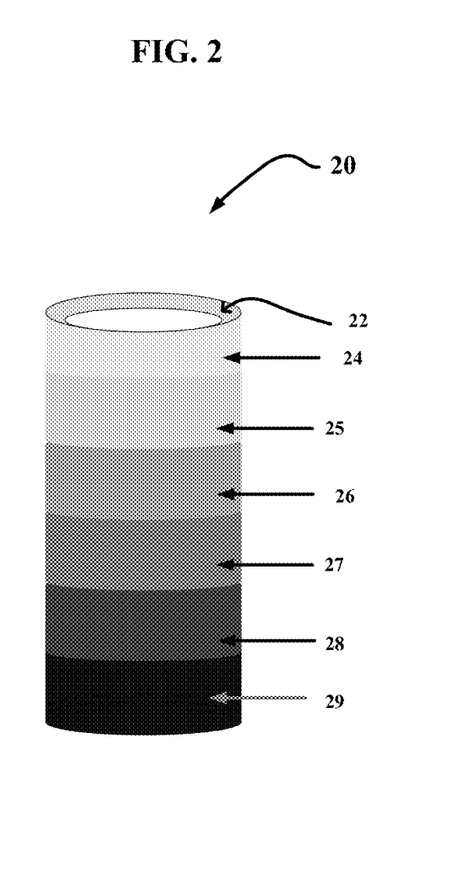
FIG. 2 depicts a cylindrical implementation of a contrast phantom of the present disclosure as described in the detailed description.

Alternatively, FIG. 2 depicts a contrast phantom 20 in a cylindrical formation. Contrast phantom 20 includes six regions 24-29, each comprising a material, such as an electrically conductive thin film on a substrate, e.g., PET. In this implementation, a rigid material 22, such as a radar absorbing material, forms a cylinder, which is then covered with the materials of regions 24-29. Although rigid material 22 in this implementation is configured into a cylinder, any other desired shape is contemplated. In some embodiments, rigid material 22 is a radar absorbing material, which also functions to absorb energy passing from an active millimeter wave imaging system (not shown) through regions 24-29.

Methods of Using Contrast Phantoms

In another aspect, the present disclosure is directed to a method of testing a contrast resolution sufficiency of an active millimeter wave imaging system, which includes selecting at least first, second and third materials, such as at least a first, second, third, fourth and/or fifth materials, wherein the first material has a first reflection coefficient; the second material has a second reflection coefficient, the third material has a third reflection coefficient, the optional fourth material has a fourth reflection coefficient and the optional fifth material has a fifth reflection coefficient. As used herein, "testing a contrast resolution sufficiency" refers to determining whether or not there is a perceptible difference between an object, subject and/or region of interest and a background, a second object and/or a second region of interest. The contrast resolution of an imaging system is the measure of its ability to provide the perceptible difference.

The materials of the present method include those described herein for the present contrast phantom, e.g., reference standard materials and/or electrically conductive materials having reflection coefficient values greater than 0 and less than 1, such as semiconductive oxides, e.g., an ITO, such as ITOs with varying amounts of doped tin, optionally deposited onto substrates, which in turn may be supported by rigid materials, e.g., a radar absorbing material.

In some embodiments, the regions comprising the reference standard materials and/or the electrically conductive materials having reflection coefficients great than 0 and less than 1 are attached to a support post and form a planar structure as described herein. In other embodiments, the materials are formed into, e.g., a cylinder, as also herein described. In some embodiments, the reflection coefficients for each of the regions are discrete and range from 0 to 1. In some embodiments, such as when the regions comprising the materials are attached to a support post, the regions are arranged in increasing or decreasing order of reflection coefficients, such as incrementally and linearly.

In some embodiments, the method further includes imaging the contrast phantom with the active millimeter wave imaging system and determining the presence or absence of contrast resolution between the regions, thereby testing the contrast resolution sufficiency of the active millimeter wave imaging system.

In some embodiments, the method further includes determining how the contrast (grayscale) image of the millimeter wave imaging system is scaled. In some embodiments, electric field magnitude is used by an active millimeter wave imaging system to create a grayscale image. Typically, in such millimeter wave imaging systems, the grayscale image scales linearly with reflection coefficient r values. In these embodiments, the grayscale image may be scaled relative to the largest return in the field of the image, e.g., a region of the contrast phantom with a high reflection coefficient, e.g., a reference standard such as aluminum. See, for example, U.S. Pat. No. 9,075,132, which is herein incorporated by reference in its entirety.

In other embodiments, the millimeter wave imaging system utilizes intensity. In these embodiments, the image may be scaled to an absolute scale. Typically, in such millimeter wave systems, the active millimeter wave imaging system will produce an image that scales linearly with reflectance. Reflectance R may be calculated as follows:

$$R=|r^2|.$$

In some embodiments, the method further comprises calibrating the millimeter wave imaging system. Calibration may comprise measuring the reflection coefficient values at each of the regions of the present contrast phantom using a millimeter wave imaging system and then comparing, for example, the measured reflection coefficient values after e.g., normalization as described herein, with the expected reflection coefficient values of the regions as determined by equation (1), for example. If, e.g., the normalized, measured reflection coefficient values for one or more of the regions are different from the expected reflection coefficient values, such as more than two standard deviations from the expected reflection coefficient values, the active millimeter wave imaging system may be adjusted (calibrated) to obtain reflection coefficient values for each region of the present contrast phantom that are closer to the expected reflection coefficient values e.g., less than two standard deviations from the expected reflection coefficient values.

EXAMPLES

Example 1. Indium Tin Oxide Semiconductor Films for Contrast Phantoms

Materials and Methods

Indium tin oxide-polyethylene terephthalate (ITO-PET) films (1 foot×1 foot×7 millimeters) were obtained from Sigma Aldrich, Inc. (St. Louis, Mo.). Laboratory measurements were performed on ITO films having sheet resistance values of 55, 100, 200, 250 and 300 ITO Ω/sq to verify their reflection coefficients.

Measurements were performed in the bands 60-90 GHz and 18-40 GHz using an apparatus described previously and depicted in FIG. 3. See Smith et al., "Measurements of the dielectric properties of explosives and inert materials at millimeter wave frequencies (V-band and above) using free space reflection methods," *Proc. SPIE* 10189 (11 May 2017), which is herein incorporated by reference in its entirety.

Figure 3:
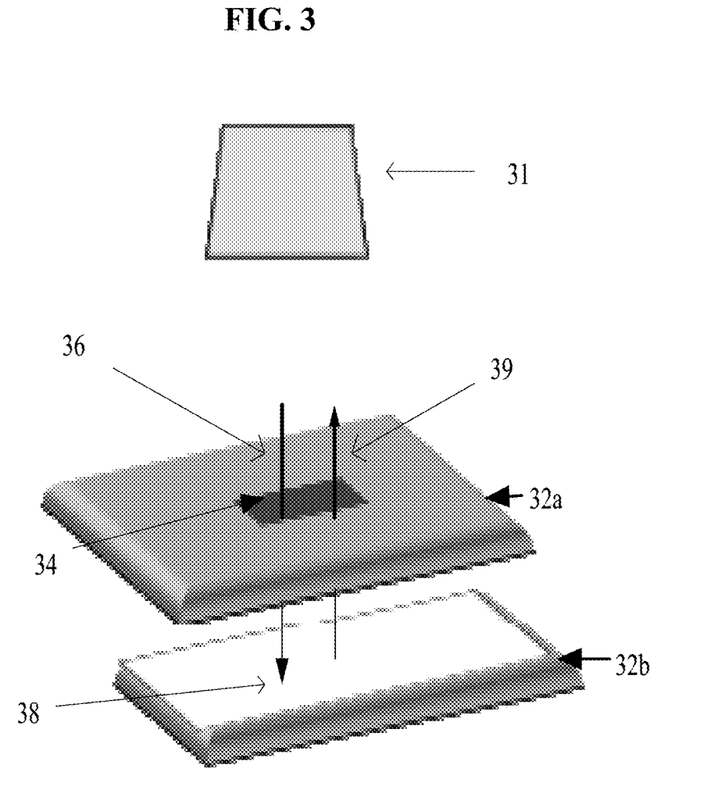
FIG. 3 depicts a system for determining a reflection coefficient of a region of a contrast phantom according to the present disclosure as described in the Examples.

Briefly, a Keysight E8364C vector network analyzer (Keysight Technologies, Inc., Santa Rosa, Calif.) was used in conjunction with a horn antenna at the band of interest to perform Sn measurements of the film. As shown in FIG. 3, a transceiver 31 (OML Inc. Morgan Hill, Calif.) was used to reach the 60-90 GHz band; 18-40 GHz was obtained directly from the network analyzer (not shown). A vertical translation stage (not shown) was used for calibrating the system and ensuring the ITO film 38 was at the calibration plane for performing measurements. The signal 36 was passed through an aperture 34 in a radar absorbing material 32*a* (TDK RF Solution, Inc., Model TDK IS-005A) to a film 38 supported by radar absorbing material 32*b*. Any reflected signal 39 from the film 38 passes back through the aperture 34 to the transceiver 31. Five measurements were made of each film in random locations.

Results

Figure 4:
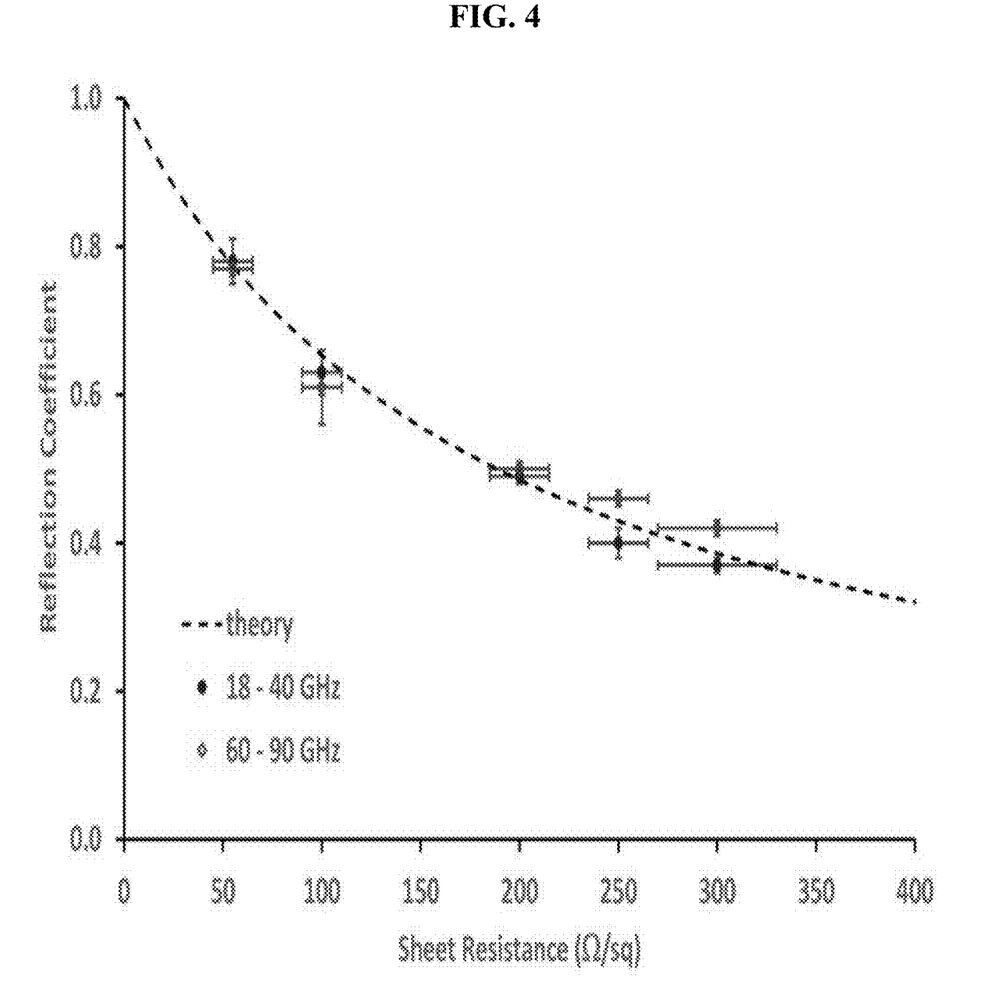
FIG. 4 depicts a graph showing that reflection coefficients are a function of sheet resistances as described in the Examples.

FIG. 4 shows the reflection coefficients obtained for the ITO films for the two bands, 18-40 GHz (solid circle) and 60-90 GHz (open diamonds) versus theory (dashed line) as determined from Equation (1). Vertical error bars are one standard deviation in the average reflection coefficients across the entire band for the five measurements at the random locations on each film; horizontal error bars are the manufacturer's tolerance in sheet resistance values. The reflection coefficient results, which are in good agreement with those expected from Equation (1), are independent of frequency.

Example 2. Construction of Contrast Phantom and Grayscale Analysis

Materials and Methods

A contrast phantom was created by attaching three 30.48 centimeter (12 inch) square sheets of ITO on PET to an aluminum support post. The ITO sheet resistances used to construct the contrast phantom were 55 ITO Ω/sq (lower), 200 ITO Ω/sq (middle) and 300 ITO Ω/sq (upper). A sheet of aluminum was included at the top of the contrast phantom as a reflection coefficient reference standard. An analysis of the grayscale of the ITO-PET films and aluminum sheet was performed using an ImageJ 1.48v. See U.S. Pat. No. 9,075, 132 for a discussion regarding grayscale and Rasband, W. S., "ImageJ", U.S. National Institutes of Health, Bethesda, Md., USA, on the World Wide Web at rsbweb.nih.gov/ij/, 1997-2017 for a discussion of the ImageJ software. Each of the foregoing references are incorporated herein by reference in its entirety. A blank area above the contrast phantom was analyzed for a value of the grayscale of air.

An image was collected using one of the Transportation Security Laboratory's several millimeter wave imaging systems. This image is presented without attribution to avoid bias towards any one particular system due to any choices made by the inventor. The analysis was performed on the two-dimensional image that was projected to the viewer, not to the three-dimensional reconstructed data available internally to these systems. See Barber et al., "Developing an ANSI standard for image quality tools for the testing of active millimeter wave imaging systems," *Proc. SPIE*, 10189, 1018905 11 May 2017), which is herein incorporated by reference in its entirety.

Results

Figure 5:
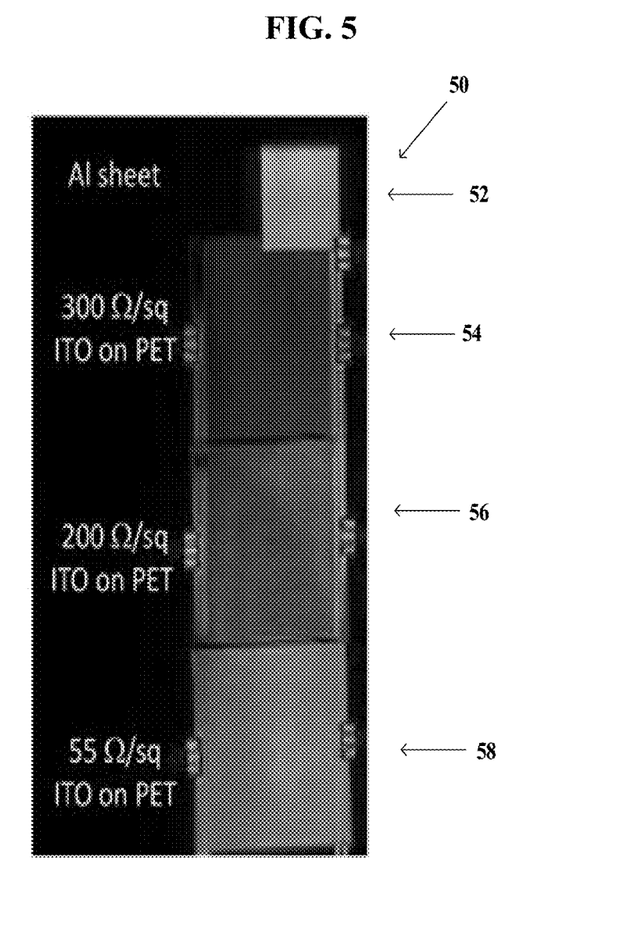
FIG. 5 depicts a grayscale image of a planar contrast phantom of the present disclosure as described in the Examples.

FIG. 5 contains an image of the above-described contrast phantom, which was collected using a millimeter wave imaging system. Table 1 contains the results of the grayscale analysis of the millimeter wave image depicted in FIG. 5. The values in parentheses are one standard deviation and refer to the last digit. Reflection coefficient values were obtained by normalizing grayscale values to that of aluminum. See U.S. Pat. No. 9,075,132 for a discussion regarding normalization, which is here incorporated by reference in its entirety.

There is generally good agreement between the measured reflection coefficient and theory. Only the result for 300 ITO Ω/sq differs by more than two standard deviations. This difference may be indicative of a drift in the calibration in this region of the imaging system, and for some users, this difference may be significant enough to trigger a further investigation into the performance of the imaging systems.

TABLE 1

Results of Grayscale Analysis

|  | Al sheet | 55 ITO Ω/sq | 200 ITO Ω/sq | 300 ITO Ω/sq | Air ITO Ω/sq |
|---|---|---|---|---|---|
| Pixels analyzed | 441 | 1156 | 1156 | 1156 | 1156 |
| Average grayscale | 146(9) | 121(11) | 71(6) | 43(4) | 3(2) |
| Reflection coefficient | [1.00] | 0.83(9) | 0.49(5) | 0.30(3) | 0.02(1) |
| Theory | 1.00 | 0.77 | 0.49 | 0.39 | 0.00 |

4. The contrast phantom of claim 1, wherein at least one of the regions is/are supported by a radar absorbing material.

5. The contrast phantom of claim 1, wherein the electrically conductive polymer comprises at least one selected from the group consisting of polypyrrole, polyaniline, polyacetylene, polythiophene, polyphenylenevinylene, polyphenylene sulfide, poly p-phenylene, polyheterocyclevinylene, poly(3,4-ethylenedioxythiophene) and its derivatives.

6. The contrast phantom of claim 1, wherein the electrically conductive polymer comprises at least one of a dopant or an electrically conductive carbon.

7. The contrast phantom of claim 1, wherein at least one region has a reflection coefficient of about 0.

8. The contrast phantom of claim 1, wherein at least one region has a reflection coefficient of about 1.

9. The contrast phantom of claim 1, wherein at least one region has a reflection coefficient ranging from 0.1-0.9.

10. The contrast phantom of claim 1, wherein the electrically conductive polymer comprises carbon doped polycarbonate.

11. A contrast phantom, comprising:
a first region with a first reflection coefficient and a first conductivity;
a second region with a second reflection coefficient and a second conductivity;
a third region with a third reflection coefficient and a third conductivity;
a fourth region with a fourth reflection coefficient and a fourth conductivity; and
a fifth region with a fifth reflection coefficient and a fifth conductivity; wherein,
at least one region has a reflection coefficient of about 0,
at least one region has a reflection coefficient of about 1, and
at least one of the regions comprises an electrically conductive polymer having a thickness of about 200 μm or less.

I claim:

1. A contrast phantom, comprising at least three regions:
a first region with a first reflection coefficient;
a second region with a second reflection coefficient; and
a third region with a third reflection coefficient,
wherein the first reflection coefficient, the second reflection coefficient and the third reflection coefficient are increasing or decreasing in value in discrete steps, and
wherein at least one of the regions comprises an electrically conductive polymer having a thickness of about 200 μm or less.

2. The contrast phantom of claim 1, wherein at least one of the regions comprises an electrically conductive polymer having a thickness of 150 nm or less.

3. The contrast phantom of claim 1, wherein at least one of the regions comprises an electrically conductive polymer having a thickness of 10 nm or less.

12. The contrast phantom of claim 11, wherein at least three of the regions have a reflection coefficient between 0.1 and 0.9, and the reflection coefficients of each of said at least three regions increase or decrease in value in discrete steps.

13. A method of testing a contrast resolution of an active millimeter wave imaging system comprising:
selecting at least a first material, a second material and a third material, wherein the first material has a first reflection coefficient, the second material has a second reflection coefficient, and the third material has a third reflection coefficient, and wherein at least one of the first material, the second material or the third material comprise(s) an electrically conductive polymer having a thickness of about 200 μm or less;
arranging the first, second and third materials into regions so that the first, second and third reflection coefficients increase or decrease in value;
imaging the first, second and third materials with the active millimeter wave imaging system; and determining the presence or absence of contrast resolution between the regions, thereby testing the contrast resolution sufficiency of the active millimeter wave imaging system.

14. The method of claim 13, wherein the materials are imaged by the active millimeter wave imaging system at an electromagnetic radiation frequency ranging from 1-500 GHz.

15. The method of claim 13, wherein the materials are imaged by the active millimeter wave imaging system at an electromagnetic radiation frequency ranging from 1-150 GHz.

16. The method of claim 13, wherein at least one of the first material, the second material or the third material comprising the electrically conductive polymer has a thickness of 150 nm or less.

17. The method of claim 13, wherein at least one of the first material, the second material or the third material comprising the electrically conductive polymer has a thickness of 10 nm or less.

18. The method of claim 13, wherein imaging the materials with the active millimeter wave imaging system comprises:
utilizing an electric field magnitude of the regions to create a grayscale image; and
scaling the grayscale image relative to a region having the highest reflection coefficient value.

19. The method of claim 13, wherein imaging the materials with the active millimeter wave imaging system comprises:
utilizing a reflectance value of the regions to create a grayscale image; and
scaling the image to an absolute scale that scales linearly with reflectance.

20. The method of claim 13, further comprising calibrating the millimeter wave imaging system, the calibrating comprising:
measuring the reflection coefficient values at each of the regions with the millimeter wave imaging system;
comparing the measured reflection coefficient values with the expected reflection coefficient values of the regions; and
when the measured reflection coefficient values for one or more of the regions are different from the expected coefficient values, adjusting the active millimeter wave imaging system to obtain reflection coefficient values for each region that are closer to the expected reflection coefficient values.

21. The method of claim 13, wherein the materials are imaged by the active millimeter wave imaging system at an electromagnetic radiation frequency ranging from 18-40 GHz.

22. The method of claim 13, wherein the materials are imaged by the active millimeter wave imaging system at an electromagnetic radiation frequency ranging from 70-150 GHz.

* * * * *